United States Patent Office 3,057,685
Patented Oct. 9, 1962

3,057,685
CYCLIC PROCESS FOR THE BENEFICIATION OF TITANIA ORES AND SLAGS
Jonas Kamlet, % The Kamlet Laboratories, 300 4th Ave. (Park Ave. S.), New York 10, N.Y.; Edna Y. Kamlet, executrix of said Jonas Kamlet, deceased
No Drawing. Filed May 23, 1960, Ser. No. 30,729
22 Claims. (Cl. 23—202)

This invention relates to a cyclic process for the beneficiation of titania ores and slags. More particularly, it relates to a cyclic process for the recovery of a pure titanium dioxide (in both the anatase and the rutile crystal forms) from ores and slags containing titanium dioxide in admixture or in chemical combination with iron oxides. It has for its purpose to obviate the expensive and often burdensome necessity of disposing of large quantities of acidic by-products, at present obtained in the recovery of titanium dioxide from ores and slags, by providing a cyclic process whereby titanium dioxide, low in iron oxide content, is recovered in conjunction with a readily disposable by-product of iron oxides, and little or no other by-product.

By far the most widely used process for the manufacture of titanium dioxide is that described by Washburn (U.S. Patent 1,889,027 (1933); British Patent 288,569 (1927); French Patent 652,357 (1928); Canadian Patent 299,992 (1930)). Ilmenite (or a high-titania iron oxide-containing slag) is ground, digested with concentrated sulfuric acid, diluted with water, treated with a reducing agent to convert ferric sulfate to the ferrous state, clarified by the addition of antimony sulfide and a proteinaceous material which carry down all suspended matter, cooled to separate the large quantity of ferrous sulfate formed and filtered to separate the filtrate of titanic sulfate. The solution of titanic sulfate is then heated, seeded with crystals of externally prepared anatase or rutile crystals, and converted to insoluble dehydrated metatitanic acid. This precipitate is filtered from the solution of sulfuric acid which retains the ferrous sulfate not crystallized out in the preceding step. The metatitanic acid is then washed with water, pulped, filtered and then calcined to obtain a pure titanium dioxide.

This process, now almost universally employed, involves the necessity of disposing of huge quantities annually of dilute sulfuric acid containing large amounts of ferrous sulfate (copperas). No economic use for this acidic by-product has yet been found although hundreds of potential uses for this waste have been proposed. It is a purpose of this invention to avoid the formation of this acidic by-product and to provide in its stead a process whereby ores and slags containing titanium dioxide and iron oxides may be separated into concentrates, one containing titanium dioxide with little or no iron oxide contaminant, the other containing the iron oxides and representing a readily salable by-product, with little or no other by-products being obtained.

The ores and slags suitable for use as raw materials in the process of the present invention are ilmenite, ilmenite-magnetite, ilmenite-hematite, titaniferous magnetite, titaniferous hematite, rutile, arizonite, titaniferous beach sands and the high-titania slag obtained by the smelting of ilmenite in the electric furnace in the presence of coke and a limestone or dolomite flux (such as the slag averaging 72% $TiO_2$ and 9% FeO obtained in the Sorel, Quebec, operation of the Quebec Iron and Titanium Corporation).

Ammonium sulfate commences to decompose at 280° C. into ammonia and ammonium bisulfate. Thus, it is often feasible to calcine an ore containing metal oxides with ammonium sulfate at temperatures in excess of 300° C., to evolve ammonia and to form ammonium bisulfate which reacts with the metal oxides in the ore at the advanced temperature of the reaction mixture, to form a mixed metal-ammonium sulfate. This is the basis of a well known process for recovery of alumina from clays. However, it has never heretofore been shown that it is possible to recover a pure titanium dioxide from titania ores and slags by a similar procedure.

The basis of my invention is the finding that titania ores and slags (containing titanium dioxide, ferrous oxide and/or ferric oxide and silica as major components) can be beneficiated by calcination with ammonium sulfate at temperatures between 300° C. and 450° C. Ammonia is evolved at these temperatures and the titanium dioxide in the ore will react with the ammonium bisulfate, to form titanic ammonium sulfate of composition

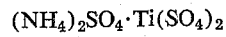

the ferrous oxide will react with the ammonium bisulfate to form ferrous ammonium sulfate; the ferric oxide will react to form ferric ammonium sulfate. The silica in the ore is not attacked but is converted, at the advanced temperatures, to an easily filterable crystalline form.

The reactions involved are:

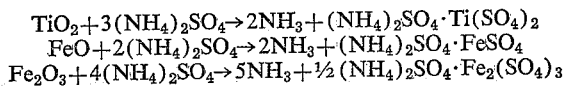

The practical temperature range for this reaction is between 300° C. and 450° C. Below 300° C., the reaction is too slow to be practical. Above 450° C., the sublimation of the ammonium sulfate and bisulfate becomes excessive. The preferred temperature range for this reaction is between 380° C. and 420° C., within which range the reaction proceeds readily and at a satisfactory rate, and little or no sublimation of ammonium sulfate-bisulfate occurs.

The time required for complete interaction between the components of the titania ore or slag may vary over a wide range, depending on the procedure used for the calcination (e.g. muffle furnace, rotary kiln, stationary kiln, etc.), and may vary from 0.5 to 4.0 hours. A reaction time within the temperature range of 380° C. to 420° C. of from one to two hours is usually satisfactory. However, this reaction period may vary over wide ranges, and I do not wish to be limited thereto in the process of this invention.

The roasted calcine is now leached with water (or recycle liquor containing ammonium sulfate, q.v. infra). The titanic ammonium sulfate dissolves readily in the water, reverting by partial hydrolysis to a soluble titanic ammonium sulfate of greater basicity—

and sulfuric acid.

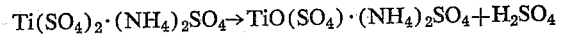

This compound—basic titanic ammonium sulfate—is soluble in water to the extent of 153.3 grams per liter at 20° C. However, if recycle liquor from the process (containing ammonium sulfate) is used to dissolve the roasted calcine, the solubility will be lower. Thus, in the presence of 300 gms./liter of $H_2SO_4$ or ammonium sulfate, the solubility of the $TiO(SO_4) \cdot (NH_4)_2SO_4 \cdot H_2O$ is only 0.82 gms./liter. Thus, in commercial practice, if the roasted calcine will be dissolved in recycle liquor, or in a mixture of water and recycle liquor, a balance will have to be drawn between the maximum concentration of $(NH_4)_2SO_4$ in this leach liquor and the solubility of the $TiO(SO_4) \cdot (NH_4)_2SO_4 \cdot H_2O$ in the leach liquor. The purpose of using the recycle liquor containing $(NH_4)_2SO_4$ is to minimize the amount of water which must ultimately be evaporated during the furnacing or calcination.

Ferrous ammonium sulfate and ferric ammonium sulfate are similarly leached from the roasted calcine by the water, or recycle liquor, or mixture of water and recycle liquor used. Ferrous ammonium sulfate is soluble to the extent of about 160 gms./liter at 20° C., as $$FeSO_4 \cdot (NH_4)SO_4 \cdot 6H_2O \text{ (Mohr's salt)}$$

and ferric ammonium sulfate is soluble to the extent of about 850 gms./liter at 20° C., as $$Fe_2(SO_4)_3 \cdot (NH_4)_2SO_4 \cdot 24H_2O$$

The silica is insoluble and does not dissolve in the leach liquor. The leach liquor will also dissolve any excess ammonium sulfate and ammonium bisulfate present in the roasted calcine.

The solution of the titanic ammonium sulfate, the ferrous ammonium sulfate, the ferric ammonium sulfate (if it is present), the excess ammonium sulfate and ammonium bisulfate, and the sulfuric acid (formed by the hydrolysis of the $Ti(SO_4) \cdot (NH_4)_2SO_4$ to $$TiO(SO_4) \cdot (NH_4)_2SO_4)$$

is now filtered from the small insoluble residue of silica, unattacked ore and minor concomitants.

The temperature of the leach liquor should be between 0° C. and 60° C. It is desirable to avoid leaching above 60° C. to prevent premature hydrolysis of the $$TiO(SO_4) \cdot (NH_4)_2SO_4 \cdot H_2O$$

to hydrated titanium dioxide.

As in the classical "acid" processes for making titanium dioxide, it is important that all of the iron ions in the leached solution be in the ferrous state, prior to the precipitation of the hydrated titanium dioxide. This is necessary to avoid any co-precipitation of basic iron salts with the titania, which may cause discoloration and inferior tinctorial properties in the final pigment.

The calcination in the rotary kiln, muffle furnace, stationary kiln, etc. may be effected by any of the methods used in the present art of calcining or roasting ores, cements, concentrates, etc. The fuel employed may be powdered coal, natural gas, hydrocarbon fuels (such as kerosene, fuel oil, etc.) or any similar carbonaceous material. All of these fuels produce reducing atmospheres in at least part of the kiln or furnace. This reducing atmosphere serves to reduce ferric iron to ferrous iron. There is also usually a small amount of organic matter present in titania ores. This also serves to reduce ferric iron to ferrous iron during the calcination.

It is also feasible to add a small amount of a carbonaceous material (powdered coke or coal), or a small amount of comminuted iron metal, to the calcination feed mix of titania ore and ammonium sulfate, to effect reduction of ferric iron to ferrous iron during the calcination.

Finally, it is entirely feasible to reduce ferric iron to ferrous iron in the leach liquor (either prior to or subsequent to the filtration from the silica), by means of addition of metallic iron (e.g. scrap iron), by addition of the calculated amount of a preformed titanous sulfate $(Ti_2(SO_4)_3)$ solution, or by passing sulfur dioxide gas into the leach liquor in quantity sufficient to reduce $Fe_2(SO_4)_3 \cdot (NH_4)_2SO_4$ to $FeSO_4 \cdot (NH_4)_2SO_4$. Such techniques for reducing ferric iron to ferrous iron are well known in the prior art relating to the "acid" processes for manufacturing titanium dioxide pigments.

Thus, we have available eseveral means for reducing ferric to ferrous iron in the process of my invention (a) reduction by the fuel combustion gases in the furnace or kiln, (b) reduction by traces of organic matter present in the ore during the calcination, (c) reduction by means of a carbonaceous material or metallic iron added to the calcination feed mix, (d) reduction in the leach liquor, either prior to or subsequent to the filtration of the silica and insoluble matter, by the addition of metallic iron, a titanous compound or gaseous sulfur dioxide. These methods may be used individually or jointly, simultaneously or concomitantly, as desired, to effect the desired reduction of ferric iron to ferrous iron in the leach liquor.

In present "acid" processes, it is customary to clarify the titanium salt solution prior to hydrolysis. This is done to free the solution of colloidal silica, undecomposed titania ore, etc. The products usually used to clarify these solutions consist of antimony sulfide and some proteinaceous material which forms coagulants which carry down suspended materials.

In the process of my invention, the calcination at advanced temperatures converts the silica and other insoluble materials to crystalline and easily filterable states. Thus, the clarification step is, as a rule, not necessary in the process of my invention.

However, I do not wish to preclude the use of a clarification step in the process of my invention. If some colloidal, suspended silica or other impurities are present in the leach liquors, a clarification step may be included after the filtration of the silica and insoluble material.

The leach liquor, after reducing the ferric iron to the ferrous state and after filtering off the silica and insoluble material, now contains titanic ammonium sulfate, ferrous ammonium sulfate, ammonium sulfate, ammonium bisulfate and sulfuric acid.

I have found (and this is a most important aspect of my invention) that in this leach liquor, the titanic ammonium sulfate is hydrolyzed substantially quantitatively to a hydrated titanium dioxide and ammonium bisulfate, by heating at a temperature between 60° C. and the boiling point of the solution at atmospheric pressure:

$$TiO(SO_4) \cdot (NH_4)_2SO_4 + H_2O \rightarrow 2NH_4HSO_4 + TiO_2$$

The ferrous ammonium sulfate and the other components in the leach liquor are not precipitated or otherwise affected by this hydrolysis. The hydrated titania is precipitated in a state of high purity and is, after a short wash with hot water, obtained substantially free of ferrous ion.

The hydrated titania may be precipitated in an amorphous state. However, it is entirely feasible to "seed" the leach liquor with anatase seed crystals, or with rutile seed crystals, as in the present "acid" processes of the prior art, and thus to recover after calcination the desired anatase or rutile modifications of the titanium dioxide pigments.

For anatase pigment, the use of the internally produced seed (Blumenfeld method) or the use of the externally produced seed (Mecklenberg or improved Mecklenberg methods) are entirely feasible in this process. For rutile pigments, the use of a peptized titania seed (e.g. prepared in the presence of an organic dibasic acid, such as citric acid) as in the processes of the prior art may be employed. (See O'Brien, Chemical Engineering Progress, 44, #11, 809–814 (November 1948); Barksdale, "Titanium" (Ronald Press Co., 1949) pages 150–200).

It must therefore be emphasized that the process of my invention may be operated to obtain, on the hydrolysis of the leach liquor:

(a) An amorphous hydrated titania precipitate which may be repulped and/or redissolved and converted by any of the processes of the prior art to anatase pigment or rutile pigment;

(b) An anatase pigment directly, by adding a suitable anatase-producing seed or nucleating agent, hydrolyzing, filtering, pulping, washing and calcining, as is now effected in any of the processes of the prior art; or (c) A rutile pigment directly, by adding a suitable rutile-producing seed or nucleating agent, hydrolyzing, filtering, pulping, washing and calcining, as is now effected in any of the processes of the prior art.

There is a very considerable amount of technology and prior art extant on the conversion of hydrated titanium dioxide to anatase, rutile, composite pigments (e.g. with calicium sulfate, barium sulfate), coalesced composite pigments (e.g. with barytes, silica, china clay, calcium sulfate, asbestine), blended composite pigments (e.g. with barium sulfate, silica, gypsum, clay, asbestine, zinc oxide, white lead, basic lead chromate, minium, basic lead sulfate, calcium carbonate, mineral fillers), colored pigments (e.g. with chromium, cobalt, copper, nickel or manganese compounds, with adsorbed organic dyes, with coalesced or blended organic pigments, etc.), and so forth.

The hydrated titanium dioxide recovered by my process may be converted to any of these forms of pigments, by the procedures and technics well known in the prior art. I am not claiming any procedure or technic for the conversion of the hydrated titanium dioxide obtained in my process to any of these commercially useful forms of titania. However, I wish it to be understood that the hydrated titania recovered in my process can be converted to any of these useful forms of titania pigments by the processes now used in the prior art for the conversion of the hydrated titania from the classical "acid" processes.

The leach liquor, after reduction of ferric to ferrous iron, and after the filtration of the silica and insoluble material, has a pH on the acid side (between pH 1.0 and 2.5). It is hydrolyzed (with or without the addition of an anatase or a rutile seed or nucleating agent) by heating (e.g. by the introduction of steam) at a temperature between 60° C. and the boiling point of the solution at atmospheric pressure, for a period of time sufficient to precipitate substantially all of the hydrated titania dioxide. This usually requires two to eight hours, but this period is by no means critical and I do not wish to be limited thereto since the dilution of the solution may greatly affect the time required for complete precipitation. With an anatase seed, heating up to six hours may be required. With a rutile seed, heating up to three hours may be required.

After precipitation, the hydrated titanium dioxide may be filtered off, washed, repulped, redissolved, reprecipitated, conditioned and/or calcined, by any of the processes of the prior art, for conversion to the desired titania or titania-containing pigments.

The mother liquor from the filtration of the hydrated titanium dioxide will contain: ferrous ammonium sulfate, ammonium sulfate, ammonium bisulfate (partially formed from the ammonium sulfate during calcination and partially formed by the hydrolysis of the $$TiO(SO_4) \cdot (NH_4)_2SO_4),$$

sulfuric acid (from the hydrolysis of the $$Ti(SO_4)_2 \cdot (NH_4)_2SO_4$$

in the calcine) and traces of unprecipitated titanic ammonium sulfate with any vanadium, chromium and manganese compounds present in the original ore.

The further treatment of this mother liquor establishes the cyclic nature of the process of my invention.

The mother liquor is now treated with the ammonia gas evolved in the first step of my process, i.e. in the calcination of the ore or slag with ammonium sulfate. The hot mother liquor from the hydrated titania filtration is treated by passing the ammonia gas evolved from the calcination through the vigorously agitated solution. I prefer to effect this reaction at a temperature between 50° C. and the boiling point of the solution, although this temperature range is by no means critical. The hot mother liquor will react rapidly with the hot kiln gases containing the ammonia. The reaction is exothermic, and substantially quantitative. Thus, the ammonia is completely scrubbed from the combustion gases containing the same, obtained during the calcination of the ore or slag and the ammonium sulfate.

The ammonia precipitated ferrous hydroxide from the ferrous ammonium sulfate. The ammonia also converts the $NH_4HSO_4$ and the $H_2SO_4$ in the liquor to $(NH_4)_2SO_4$:

$$FeSO_4 \cdot (NH_4)_2SO_4 + 2NH_3 \rightarrow 2(NH_4)_2SO_4 + Fe(OH)_2$$
$$NH_4HSO_4 + NH_3 \rightarrow (NH_4)_2SO_4$$
$$H_2SO_4 + 2NH_3 \rightarrow (NH_4)_2SO_4$$

The precipitated $Fe(OH)_2$ is gelatinous and somewhat difficult to filter off. I have found that if air, or an oxygen-containing gas, is passed through the mother liquor during the reaction with the ammonia, the $Fe(OH)_2$ is oxidized to a dense, compact mixture of ferrosoferric oxide ($Fe_3O_4$) and ferric oxide ($Fe_2O_3$) which is quite readily sedimented, decanted, filtered or centrifuged off. This simultaneous oxidation of the ferrous hydroxide to an easily separated iron oxide mixture is optional. This oxidation may also be interrupted at intermediate stages of oxidation, to give a series of readily filterable yellow, brown, red and black iron oxide mixture suitable for conversion to pigments.

Any chromium, vanadium and manganese present in the original ore or slag is carried through in the leach liquor and mother liquor, and is precipitated (as metal oxides) with the iron hydroxides, or iron oxides.

After filtering off the iron hydroxides and/or iron oxides, the filtrate consists substantially of an aqueous solution of ammonium sulfate. The recovery of the ammonium sulfate is excellent. Between 40.0 and 60.0 parts by weight of $(NH_4)_2SO_4$ are lost in each cycle for every 100.0 parts by weight of $TiO_2$ (100% basis) produced.

In the initial calcination, the ore or slag may be mixed in the dry state with ammonium sulfate, and calcined. If this is the procedure used, the ammonium sulfate solution recovered above is concentrated and crystallized, and the solid ammonium sulfate recovered is recycled to the process (with a little "make-up" to compensate for losses) for reaction with the next batch of ore or slag.

However, I prefer to use a slurry feed for the calcination step. The titania ore or slag is ground and made into a slurry with an aqueous ammonium sulfate solution. This slurry is fed (preferably) to a rotary kiln, under the reaction conditions described above. After leaching, reducing the ferric iron, filtering, hydrolyzing, filtering off the hydrated titania, reacting the filtrate with the evolved $NH_3$ from the calcination, and filtering off the iron oxides (as above described), the ammonium sulfate solution is regenerated and recycled to the first step of the process, i.e., the calcination.

In order to reduce the amount of water which has to be evaporated, it is feasible to recycle this $(NH_4)_2SO_4$ liquor (or at least a part of this liquor with added water) to the step where the calcine is leached. Here the decreased solubilities of the titanic ammonium sulfate and the ferrous ammonium sulfate come into consideration. A balance has to be drawn between the solubility of the components of the calcine and the maximum amount of ammonium sulfate which may be recycled in the leach liquors.

Many titania ores contain traces of chromium, vanadium and manganese compounds. The fate of these trace elements in the process of my invention may be explained. These form soluble sulfates during the calcination with the $(NH_4)_2SO_4$. These soluble sulfates dissolve during the leaching, are not precipitated during the reduction of ferric to ferrous iron, and are not precipitated during the hydrolysis of the titanic ammonium sulfate. In the last step, when the filtrate is treated with the ammonia gas, these are precipitated as metal hydroxides with the $Fe(OH)_2$. Thus, these trace elements are finally recovered as metal oxides, admixed with the iron oxides obtained as by-products of this process.

The iron oxides contents of the ores and slags are thus obtained, after drying and calcining the precipitate obtained in the reaction with ammonia, in a state of high purity (usually in excess of 95% $Fe_2O_3$ and $Fe_3O_4$) and containing traces of vanadium, chromium and manganese oxides. These iron oxides represent a valuable by-product of this process and are ideally suited for use in powder metallurgy for reduction to sponge iron and steel in the so-called "direct iron" processes, for use in the manufacture of iron oxide pigments, for conversion to iron salts, for recovery of vanadium, chromium and manganese values, for upgrading low-grade iron ores and concentrates, in ceramics, for addition to animal feeds, et cetera.

It is obvious to any person skilled in the art that this process is susceptiible to many modifications. Thus, it is feasible to crystallize out part of the ferrous ammonium sulfate, and to separate it from the solution of titanic ammonium sulfate and unseparated ferrous ammonium sulfate. These two fractions may then be processed further separately. It is also feasible to obtain a very pure hydrated titania by precipitating the $$TiOSO_4 \cdot (NH_4)_2SO_4 \cdot H_2O$$

by adding ammonium sulfate to a solution containing the same, taking advantage of the marked differences in solubility described above (153.3 gm./liter water at 20° C., but only 0.82 gms./liter in a solution containing 300 gms./liter $(NH_4)_2SO_4$ or $H_2SO_4$). This precipitated titanic ammonium sulfate may then be slurried and hydrolyzed (with or without addition of anatase or rutile seed or nucleating agents) in comparatively concentrated solutions (e.g. as concentrated as 200–250 gms./liter $TiO_2$ equivalent). Such modifications and improvements of my process will be obvious to any person skilled in the art.

Initial experiments were conducted to determine the optimum proportions of ore (or slag) and ammonium sulfate for use in the process of this invention.

A New York State ilmenite ore was used in these experiments.

| Composition | Gram-moles per 100 gms. ore | Gram-moles of Ammonium Sulfate required by theory for 100 gms. ilmenite ore |
|---|---|---|
| Titanium dioxide, 43.8% | 0.55 | 1.65 |
| Ferrous oxide—FeO, 35.7% | 0.50 | 1.00 |
| Ferric oxide—Fe$_2$O$_3$, 5.1% | 0.032 | 0.128 |
| Silica | 0.068 | |
| Total (NH$_4$)$_2$SO$_4$ required | | ¹ 2.778 |

¹ Gram-moles or 370 grams of $(NH_4)_2SO_4$ per 100 grams of ore.

To determine optimum proportions, I made a uniform slurry of 100 gms. of the ore with 100%, 125%, 150%, 175% and 200% of the theoretical amount of ammonium sulfate was used as a 20% aqueous solution. This was made into a fine slurry with the ore, in a ball mill, and was then evaporated to a thick paste. The paste was baked in a muffle furnace at 390° C. to 410° C. (temperature within the calcine) for three hours. The ammonia evolved was conducted off and used for the processing of a similar preceding batch (to establish a materials balance).

The calcine was then leached with water, ferric iron was reduced as above described, and the titania was precipitated by boiling for four hours. The filtered titania precipitate was analyzed. The following titania recoveries were obtained:

Ammonium sulfate used (Theoretical—370 gms./100 gms. ore), percent:    Titanium dioxide recovery, percent
- 100 _____ 72.5
- 125 _____ 87.0
- 150 _____ 93.8
- 175 _____ 93.9
- 200 _____ 94.1

Thus, it will be noted that, while the use of a theoretical amount of $(NH_4)_2SO_4$ gives good recoveries, the use of 125% to 200% of theoretical gives better recoveries of titania. No practical advantage seems to be gained from using more than 150% of theoretical of $(NH_4)_2SO_4$.

I therefore use 100% to 200% of the theoretical amount, and preferably 150% of the theoretical amount of $(NH_4)_2SO_4$ required to convert all of the titania in the ore to $Ti(SO_4)_2 \cdot (NH_4)_2SO_4$, all of the ferrous iron in the ore to $FeSO_4 \cdot (NH_4)_2SO_4$ and all of the ferric iron in the ore to $Fe_2(SO_4)_3 \cdot (NH_4)_2SO_4$.

The "make-up" for the small losses of ammonium sulfate may be in the form of $(NH_4)_2SO_4$ solid or solution added to the calcination feed mix of recycle $(NH_4)_2SO_4$ liquor and ore or slag.

It is also feasible to add this "make-up" $(NH_4)_2SO_4$ in another manner. Sulfur dioxide gas may be used to reduce the ferric ammonium sulfate (when present) to the ferrous state:

$$Fe_2(SO_4)_3 \cdot (NH_4)_2SO_4 + SO_2 + 2H_2O \rightarrow$$
$$FeSO_4 \cdot (NH_4)_2SO_4 + FeSO_4 + 2H_2SO_4$$

Thus, two moles of $H_2SO_4$ are added to the circulating liquor per mole of $Fe_2(SO_4)_3$ equivalent reduced. In the neutralizing step, when the filtrate is reacted with the kiln gases containing $NH_3$ additional gaseous or aqua ammonia may be added to compensate for this $H_2SO_4$ formed. Thus, part or all of the "make-up" $(NH_4)_2SO_4$ may be introduced into the circulating system as inexpensive $SO_2$ gas and ammonia.

Subsequent experiments with a series of other titania ores and slags confirmed th fact the good titania solubilizations and recoveries can be obtained in each case with 100% to 200% of the theoretical amounts of ammonium sulfate, and that the preferred amount of ammonium sulfate is about 150% of theoretical.

Processes employing ammonium sulfate have been described in the past for the recovery of alumina from clays, kaolins and bauxites (St. Clair & Ravitz, Trans. A.I.M.E. 159, 255–265 (1944); Bureau of Mines, Report of Investigations 4183 (1948); Hunyady, U.S. Patent 2,160,148 (1939); Buchner U.S. Patent 1,493,320 (1924); Lyons, U.S. Patent 2,388,983 (1945); Lyons, U.S. Patent 2,354,133 (1944)) and others. All of these processes involve a complicated and expensive separation of aluminum compounds (e.g. ammonium aluminum sulfate) from concomitant iron compounds. Several crystallizations, solvent extractions, purifications, etc. are often required. It was therefore surprising to find that I could effect a neat and clean separation of titania from iron compounds by the process of my invention. By simply heating a solution containing $TiO(SO_4) \cdot (NH_4)_2SO_4$ and $$FeSO_4 \cdot (NH_4)_2SO_4$$

the titania is selectively and substantially quantitatively precipitated whereas the iron compound was unaffected. The difficulty of the separation of aluminum from iron values made the prior art ammonium sulfate processes commercially impractical as a route to alumina. The ease and simplicity of the separation of titania from iron values makes the process of this invention highly practical from the commericail point of view. Instead of consuming large volumes of sulfuric acid and obtaining large quantities of a difficultly disposable by-product of copperas, we consume susbstantially no reagents (except for minor amounts of "make-up" ammonium sulfate and reducing agents, such as scrap iron or $SO_2$) and obtain a valuable, easily disposable co-product of relatively pure iron oxides.

The following examples are given to define and to illustrate this invention, but in no way to limit it to reagents, proportions or conditions described therein. Obvious modifications will occur to any person skilled in the art.

*Example I—Slurry. Kiln Feed*

An ilmenite ore assaying 43.8% $TiO_2$, 35.7% FeO, 5.1% $Fe_2O_3$ and 4.1% $SiO_2$ was used. The ore (100.0 kgs.) is made into a fine slurry with 2775 liters of 20% ammonium sulfate solution (555 kgs. $(NH_4)_2SO_4$—150% theoretical)

and fed to a direct fired (fuel oil) rotary kiln for a residence period of 2.5 to 3.0 hours at a temperature of 380° C. to 420° C. Ammonia is evolved with the combustion gases and is conducted off for reaction with the filtrate of a preceding similar batch.

The hot calcine (weighing totally 570 kgs.) is cooled, comminuted and leached with a total of 4000 liters of water (or a mixture of water and recycle ammonium sulfate liquor) at a temperature of 25° C. to 30° C. About 10.0 kgs. of scrap iron are also added to the mixture, to effect reduction of ferric iron to ferrous iron during the leaching.

After complete extraction, the small amount of insoluble material (silica, unattacked ore, etc.) is filtered off. It is also feasible to effect the reduction of ferric iron after this filtration, in which case the excess of scrap iron is recoverable and may be recycled. It is also feasible to effect the reduction by the introduction of $SO_2$ gas or a titanous sulfate solution.

The filtered, reduced solution (which is free of ferric ion by analytical procedures) is now heated with steam to 95°–100° C., and is kept at that point until no further precipitation of hydrated titanium dioxide occurs (about four hours). This solution may be seeded with anatase or rutile seed or nucleating agents prior to the hydrolysis, as above described.

The hydrated titanium dioxide is filtered off, washed with 400 liters of boiling water (until the wash-water is free of ferrous ion) and is further processed to pigments, or to any other end-use desired, as above described.

The combined filtrate and washings are now used to scrub the ammonia from the combustion gases of an identical subsequent batch of kiln feed. During this scrubbing (and neutralization of the filtrate and washings by the absorbed ammonia), the solution is kept at 90° C.–95° C. and a vigorous stream of air is passed through the solution until the gelatinous ferrous hydroxide is oxidized to a dense, compact, easily filterable ferroso-ferric oxide. The ferroso-ferric oxide is filtered off and dried in a short rotary kiln at 200°–250° C.

The filtrate, on analysis, is found to contain 535.0 kgs. of $(NH_4)_2SO_4$. This is "made-up" by the addition of 20.0 kgs. of ammonium sulfate. The volume of the filtrate will have been concentrated during the aeration and the neutralization by the scrubbed ammonia, to about 2800 liters. This solution, fortified with the "make-up" ammonium sulfate, will therefore be equivalent to the original solution of 555 kgs. of $(NH_4)_2SO_4$ and is recycled to the process for calcining with the next batch of 100 kgs. of ore.

There is thus recovered 40.3 kgs. of titanium dioxide (100% equivalent) and 37.9 kgs. of ferrosoferric oxide. The reagent consumption is 100.0 kgs. of ore, 20.0 kgs. of "make-up" ammonium sulfate and 1.6 kgs. of scrap iron.

*Example II—Dry Furnace Feed*

A high-titania slag, made by the smelting of a titania ore in the electric furnace in the presence of coke and a limestone flux, assaying 72.0% $TiO_2$, 9.0% FeO, 3.9% metallic iron and 6.1% silicia was used. Theory requires the use of 386.4 parts of $(NH_4)_2SO_4$ for each 100.0 parts of this slag in the process of this invention.

The comminuted slag (100.0 kgs.) is intimately mixed with 677.0 kgs. of crystalline ammonium sulfate (175% of theory) and the mixture is heated in a muffle furnace at a temperature of 400°–420° C. for a residence period of from 2.0 to 2.5 hours. Ammonia is evolved during this furnacing and is conducted off for reaction with the filtrate of a preceding similar batch.

The hot calcine is cooled, comminuted, and leached with a total of 4200 liters of water (or a mixture of water and recycle ammonium sulfate liquor) at a temperature of 30° C. to 35° C. Since the iron in the calcined product is all in the ferrous state (and metallic iron is present in the calcine), no separate reduction step is necessary. The leached calcine is filtered from insoluble material.

The filtrate is now heated with steam at 95° C.–100° C. until no further precipitation of hydrated titanium dioxide occurs, i.e. about three hours. The solution may be seeded with anatase or rutile seed or nucleating agents prior to the hydrolysis, as above described.

The hydrated titanium dioxide is filtered off, washed with 500 liters of boiling water (until the wash water is free of ferrous ion), and is further processed to pigments, or to any other end-use desired, as above described.

The combined filtrate and washings are now used to scrub the ammonia from the furnace gases evolved from an identical subsequent batch of furnace feed. During this scrubbing (and neutralization of the filtrate and washings by the absorbed ammonia), the solution is kept at 90°–95° C. The ferrous hydroxide precipitate is filtered off and washed with hot water. The combined filtrate and washing are concentrated under reduced pressure, and crystallized. There is thus recovered a total of 648.0 kgs. of ammonium sulfate. This is employed, together with 29.0 kgs. of "make-up" ammonium sulfate, to provide the 677.0 kgs. of $(NH_4)_2SO_4$ required for the next batch of 100.0 kgs. of the slag.

There is thus recovered 67.7 kgs. of titanium dioxide (100% basis) from 100.0 kgs. of the slag. The only other reagent consumption is 29.0 kgs. of "make-up" ammonium sulfate.

Having described my invention, what I claim and desire to protect by Letters Patent is:

1. A cyclic process for the beneficiation of titania ores and slags which comprises the steps of:
    (a) reacting the raw material with ammonium sulfate at a temperature between 300° C. and 450° C., the ammonium sulfate being present in quantity at least sufficient to react with the titania present to form $$Ti(SO_4)_2 \cdot (NH_4)_2SO_4$$

to react with the FeO present to form $$FeSO_4 \cdot (NH_4)_2SO_4$$

to react with the $Fe_2O_3$ present to form $$Fe_2(SO_4)_3 \cdot (NH_4)_2SO_4$$

and to evolve ammonia;
    (b) leaching the calcined reaction product with an aqueous medium consisting primarily of water in quantity at least sufficient to dissolve all of the $$Ti(SO_4)_2 \cdot (NH_4)_2SO_4$$

and at least a portion of the iron ammonium sulfates;
    (c) converting any ferric ammonium sulfate in said leached solution to ferrous ammonium sulfate by the addition of a reducing agent capable of effecting said transformation;
    (d) separating the solution of titanic ammonium sulfate and ferrous ammonium sulfate from insoluble material;
    (e) hydrolyzing the said solution of titanic ammonium sulfate and ferrous ammonium sulfate by heating at a temperature between 60° C. and the boiling point of the solution, until substantially all of the titanic ammonium sulfate has been precipitated as hydrated titanium dioxide,
    (f) separating and recovering the titanium dioxide from the aqueous solution containing ferrous ammonium sulfate, ammonium sulfate, ammonium bisulfate and sulfuric acid;
    (g) reacting the aqueous solution containing ferrous ammonium sulfate, ammonium sulfate, ammonium bisulfate and sulfuric acid, obtained in step (f) with the ammonia evolved in step (a), to precipitate ferrous hydroxide and to form an ammonium sulfate solution;
    (h) separating the ferrous hydroxide from the ammonium sulfate solution, and recovering and recycling the ammonium sulfate therefrom to step (a) of the process.

2. The process of claim 1 in which the reaction of step (a) is effected at a temperature between 380° C. and 420° C.

3. The process of claim 1 in which the reaction of step (a) is effected during a period of from 0.5 to 4.0 hours.

4. The process of claim 1 in which the aqueous medium used for leaching the calcined reaction product in step (b) is water.

5. The process of claim 1 in which the aqueous medium used for leaching the calcined reaction product in step (b) is at least in part the recycle ammonium sulfate solution from step (h) of the said process.

6. The process of claim 1 in which the temperature of the aqueous medium used for leaching the calcined reaction product in step (b) is between 0° C. and 60° C.

7. The process of claim 1 in which the reducing agent in step (c) is a carbonaceous material added during the calcination.

8. The process of claim 1 in which the reducing agent in step (c) is metallic iron.

9. The process of claim 1 in which the reducing agent in step (c) is sulfur dioxide.

10. The process of claim 1 in which the reducing agent in step (c) is a titanous salt.

11. The process of claim 1 in which the solution of titanic ammonium sulfate and ferrous ammonium sulfate is hydrolyzed in step (e) to precipitate titanium dioxide, by heating at a temperature of between 60° C. and the boiling point of the solution for a period of from two to eight hours.

12. The process of claim 1 in which the aqueous solution containing ferrous ammonium sulfate, ammonium sulfate, ammonium bisulfate and sulfuric acid obtained in step (f) is reacted with the ammonia evolved in step (a), said reaction being effected in step (g) of said process, at a temperature between 50° C. and the boiling point of the solution, to precipitate ferrous hydroxide and to form an ammonium sulfate solution.

13. The process of claim 1 in which an oxygen-containing gas is passed through the reaction mixture during step (g) to convert the ferrous hydroxide to a member of the group consisting of $Fe_2O_3$, $Fe_3O_4$ and a mixture thereof.

14. The process of claim 1 in which air is passed through the reaction mixture during step (g) to convert the ferrous hydroxide to a member of the group consisting of $Fe_2O_3$, $Fe_3O_4$ and a mixture thereof.

15. The process of claim 1 in which a substantially dry mixture of the raw material and ammonium sulfate is reacted in step (a), and the ammonium sulfate solution obtained in step (h) is concentrated, converted to solid ammonium sulfate and recycled to step (a) of said process.

16. The process of claim 1 in which a slurry of the raw material and an aqueous ammonium sulfate solution is reacted in step (a), and the ammonium sulfate solution obtained in step (h) is recycled to step (a) of said process.

17. The process of claim 1 in which ammonium sulfate is added to the solution of titanic ammonium sulfate and ferrous ammonium sulfate obtained in step (d), solid titanic ammonium sulfate which crystallizes out is separated, and said titanic ammonium sulfate is subsequently hydrolyzed in an aqueous medium to precipitate titanium dioxide.

18. The process of claim 1 in which the ammonium sulfate in step (a) is used in an amount equivalent to from 100% to 200% of the amount theoretically required to react with the titania present to form $$Ti(SO_4)_2 \cdot (NH_4)_2SO_4$$

to react with the FeO present to form $FeSO_4 \cdot (NH_4)_2SO_4$, to react with the $Fe_2O_3$ present to form $$Fe_2(SO_4)_3 \cdot (NH_4)_2SO_4$$

and to evolve ammonia.

19. The process of claim 1 in which the ammonium sulfate in step (a) is used in an amount equivalent to 150% of the amount theoretically required to react with the titania present to form $Ti(SO_4)_2 \cdot (NH_4)_2SO_4$, to react with the FeO present to form $FeSO_4 \cdot (NH_4)_2SO_4$, to react with the $Fe_2O_3$ present to form $$Fe_2(SO_4)_3 \cdot (NH_4)_2SO_4$$

and to evolve ammonia.

20. The process of claim 1 in which the solution of titanic ammonium sulfate is hydrolyzed in step (c) to precipitate titanium dioxide in the presence of a nucleating agent, said nucleating agent being a pure polymorph of titania.

21. The process of claim 1 in which the solution of titanic ammonium sulfate is hydrolyzed in step (c) to precipitate titanium dioxide in the presence of a nucleating agent, said nucleating agent being the anatase modification of titania.

22. The process of claim 1 in which the solution of titanic ammonium sulfate is hydrolyzed in step (c) to precipitate titanium dioxide in the presence of a nucleating agent, said nucleating agent being the rutile modification of titania.

References Cited in the file of this patent

UNITED STATES PATENTS 1,995,334    Svendsen _____ Mar. 26, 1935

OTHER REFERENCES

Chem. Abstracts, vol. 52, page 18047, Taki article relating to ammonium titanyl sulfate.